US011162579B2

(12) United States Patent
Park et al.

(10) Patent No.: US 11,162,579 B2
(45) Date of Patent: Nov. 2, 2021

(54) DIAL TYPE SHIFT CONTROL APPARATUS FOR ELECTRONIC SHIFT SYSTEM

(71) Applicants: Hyundai Motor Company, Seoul (KR); Kia Motors Corporation, Seoul (KR); SL Corporation, Daegu (KR)

(72) Inventors: Han Gil Park, Suwon-si (KR); Ki Young Song, Suwon-si (KR); Sung Hoon Lee, Daegu (KR); Min Gwon Lee, Gyeongsan-si (KR); Joo Young Kim, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 16/857,315

(22) Filed: Apr. 24, 2020

(65) Prior Publication Data

US 2021/0148456 A1 May 20, 2021

(30) Foreign Application Priority Data

Nov. 14, 2019 (KR) .................. 10-2019-0145672

(51) Int. Cl.
*F16H 59/08* (2006.01)
*B60K 37/06* (2006.01)

(52) U.S. Cl.
CPC ............ *F16H 59/08* (2013.01); *B60K 37/06* (2013.01); *B60K 2370/126* (2019.05); *F16H 2059/081* (2013.01)

(58) Field of Classification Search
CPC ... F16H 2059/081; F16H 59/08; B60K 37/06; B60K 2370/126; G05G 1/10; G05G 1/105; G05G 1/12
See application file for complete search history.

(56) References Cited

U.S. PATENT DOCUMENTS

| 5,925,709 | A | 7/1999 | Takahashi et al. |
| 7,579,559 | B2* | 8/2009 | Schelbert ............... B60K 37/06 200/4 |
| 8,536,472 | B2 | 9/2013 | Wu et al. |
| 8,884,933 | B2* | 11/2014 | Yokoyama ............ G06F 3/0362 345/184 |
| 2006/0096845 | A1* | 5/2006 | Zegula ..................... G05G 5/03 200/341 |
| 2006/0227528 | A1 | 10/2006 | Nakamoto et al. |
| 2007/0272524 | A1 | 11/2007 | Girke et al. |
| 2012/0055763 | A1 | 3/2012 | Chou |
| 2014/0090499 | A1 | 4/2014 | Fernandez |
| 2014/0130632 | A1 | 5/2014 | Karlsson et al. |
| 2018/0259062 | A1 | 9/2018 | Wang et al. |
| 2018/0372216 | A1 | 12/2018 | Yamanaka et al. |
| 2020/0166122 | A1 | 5/2020 | Yamamoto et al. |

FOREIGN PATENT DOCUMENTS

KR 20190050374 A 5/2019

* cited by examiner

*Primary Examiner* — Thomas C Diaz
(74) *Attorney, Agent, or Firm* — Slater Matsil, LLP

(57) ABSTRACT

A dial type shift control apparatus for an electronic shift system is provided. The dial type shift control apparatus includes a main housing having a boss portion protruding upward, a bearing fitted to an outside of the boss portion, a rotator fitted to an outside of the bearing, and a shift dial coupled to the rotator. The shift dial covers the rotator and the bearing from above, and the shift dial is configured to rotate with the rotator when operated by a driver.

20 Claims, 7 Drawing Sheets

DIAL TYPE SHIFT CONTROL APPARATUS FOR ELECTRONIC SHIFT SYSTEM

CROSS-REFERENCE TO RELATED APPLICATIONS

This application claims priority to Korean Patent Application No. 10-2019-0145672, filed on Nov. 14, 2019, which application is hereby incorporated herein by reference.

TECHNICAL FIELD

The present disclosure relates to a dial type shift control apparatus for an electronic shift system.

BACKGROUND

In general, a vehicle equipped with an automatic transmission may control a hydraulic pressure in a shift range set depending on a driving speed of the vehicle, and thus allow a shift gear to be automatically operated in a range of target shift stages.

The automatic transmission may generate a gear ratio using a hydraulic circuit, a planetary gear and a friction element to perform a transmission and a transmission control unit (TCU) may serve to control these components.

Unlike a conventional mechanical shift system, a shift by wire (hereinafter, SBW) system, i.e., a vehicle electronic shift system, does not have a mechanical connection configuration such as a cable connecting a shift with a shift control apparatus (e.g., lever, button or dial). The SBW system may perform an electronic shift control in such a manner that the transmission control unit (TCU) receives a signal generated during an operation of the electronic shift control apparatus (shift lever, button or dial), the electronic signal commanded by the TCU may thus allow a shift actuator (shift cable motor or select cable motor) to be operated, and the operation of the shift actuator may allow the hydraulic pressure to be applied to or shut off from the hydraulic circuit for each shift stage.

Therefore, the automatic transmission based on the SBW system may transmit a driver's shift intention to the TCU as an electric signal through a simple operation of the electronic shift control apparatus (shift lever, button or dial), thereby making it easier to perform a shift operation to drive (D), reverse (R) and Null (including neutral and drive (Nd) and neutral and reverse (Nr)) stages. In addition, due to its compact size, the shift control apparatus may secure a large space between a driver's seat and a passenger's seat.

Shift operation types in the electronic shift system may be schematically divided into a lever type using a lever, a button type using a button and a dial type using a dial.

A conventional dial type shift control apparatus may have a configuration in which a dial corresponding to a rotated component is directly installed in a housing corresponding to a fixed component, such that the dial is in direct contact with the housing. Therefore, friction may occur between the housing and the dial when the dial is rotated and operated, resulting in occurrences of wear and noise and reduction of durability of the apparatus. In addition, the driver may feel different due to the friction and thus feel uncomfortable when operating the dial.

In addition, in case that the driver releases the operation of the shift dial after rotating the dial from the Null stage to the D stage or from the Null stage to the R stage, the dial which is rotated to the D stage or the R stage is supposed to be rotated in an opposite direction by resilience of its spring and thus be returned to the Null stage again. However, in the conventional configuration in which the housing and the dial are installed to be in direct contact with each other, friction may occur between the housing and the dial. Such friction may cause a 'stuck' phenomenon of the dial, which prevents the dial from smoothly returning to the Null stage. This phenomenon may thus cause a problem in a quality of the apparatus.

The contents described as the related art have been provided only for assisting in the understanding for the background of the present disclosure and should not be considered as corresponding to the related art known to those skilled in the art.

SUMMARY

The present disclosure relates to a dial type shift control apparatus for an electronic shift system. Particular embodiments provide a dial type shift control apparatus for an electronic shift system including a bearing installed between a housing corresponding to a fixed component and a dial corresponding to a rotated component.

An embodiment of the present disclosure provides a dial type shift control apparatus for an electronic shift system including a bearing installed between a housing corresponding to a fixed component and a dial corresponding to a rotated component. The bearing may prevent a direct contact between the housing and the dial. Therefore, it is possible to avoid friction occurring between the housing and the dial when the dial is rotated and operated. In this manner, it is also possible to avoid wear and noise by the friction, thereby improving durability of the apparatus. Furthermore, the driver may not feel different due to the friction, and thus sense an improved operation of the apparatus.

Another embodiment of the present disclosure provides a dial type shift control apparatus for an electronic shift system, having an improved quality in such a manner that the bearing is used to prevent friction from occurring between the housing and the dial, thereby avoiding a 'stuck' phenomenon of a dial which is rotated to a drive (D) stage or a reverse (R) stage.

According to an embodiment of the present disclosure, a dial type shift control apparatus for an electronic shift system includes a main housing having a boss portion protruding upward, a bearing fitted to an outside of the boss portion, a rotator fitted to an outside of the bearing, and a shift dial coupled to the rotator. The shift dial is installed to cover the rotator and the bearing from above and to rotate with the rotator when operated by a driver.

The dial type shift control apparatus for an electronic shift system may further include a bearing holder installed in the shift dial to be in contact with an upper surface of the bearing and restraining an upward movement of the bearing to prevent the bearing from being deviated.

The boss portion may include a primary boss protruding in a shape of a cylinder and a secondary boss formed in a shape of a cylinder having a larger diameter than that of the primary boss and positioned at an outside of the primary boss. The rotator may be fitted to an outside of the secondary boss, and the bearing may be fitted into a gap between the secondary boss and the rotator.

The boss portion may include a primary boss protruding in the shape of a cylinder and a secondary boss formed in the shape of a cylinder having a larger diameter than that of the primary boss and positioned at an outside of the primary boss. The bearing may be fitted to the outside of the secondary boss, and the bearing holder may be fitted to a gap between the primary boss and the secondary boss to be in contact with the upper surface of the bearing.

The bearing may include an inner race fitted to the outside of the secondary boss to be integrally coupled to the secondary boss; an outer race fitted to an inside of the rotator to be integrally coupled to the rotator, and a plurality of balls positioned between the inner race and the outer race.

Bearing support jaws may be respectively formed on the outside of the secondary boss and the inside of the rotator to allow lower surfaces of the bearing to be seated thereon.

A dial flange protruding toward the bearing installed between the secondary boss and the rotator may be integrally formed onto an inner surface of the shift dial and when the bearing is moved upward, the dial flange may be brought into contact with the bearing to prevent the bearing from being deviated upward together with the bearing holder.

The bearing may include the inner race coupled to the secondary boss, the outer race coupled to the rotator and the balls positioned between the inner race and the outer race. A light guide may be fitted to the outside of the primary boss to be coupled to the primary boss. The bearing holder may include a holder coupling portion and a bearing press portion, the holder coupling portion being formed in a shape of a cylinder, being fitted to a gap between the light guide and the secondary boss and having upper and lower ends fixedly coupled to the light guide and the secondary boss, respectively, and the bearing press portion being formed to protrude outward from the holder coupling portion and pressing an upper surface of the inner race of the bearing.

DETAILED DESCRIPTION OF ILLUSTRATIVE EMBODIMENTS

Figure 1:
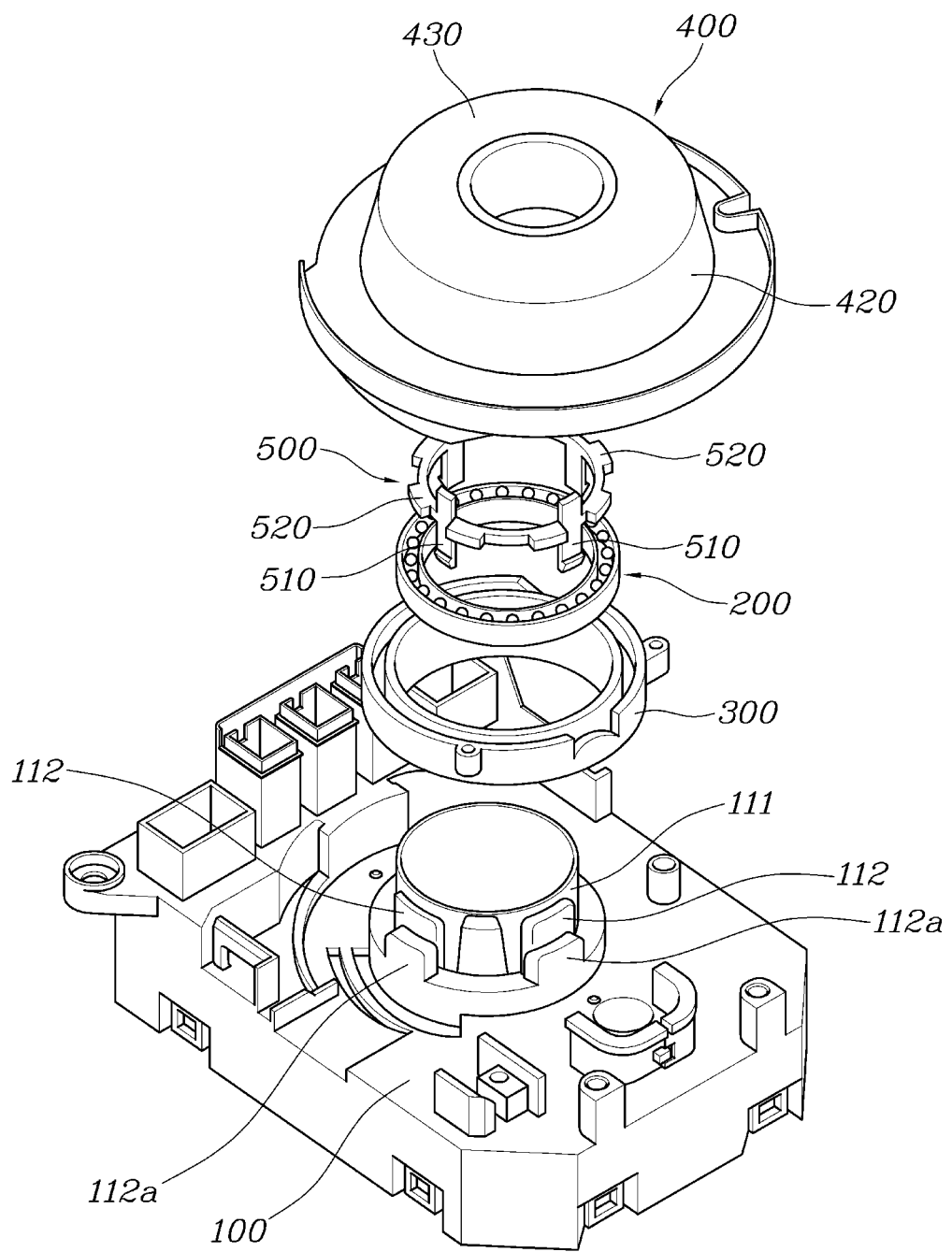
FIG. 1 is an exploded perspective view of a dial type shift control apparatus for an electronic shift system according to an embodiment of the present disclosure.
Figure 2:
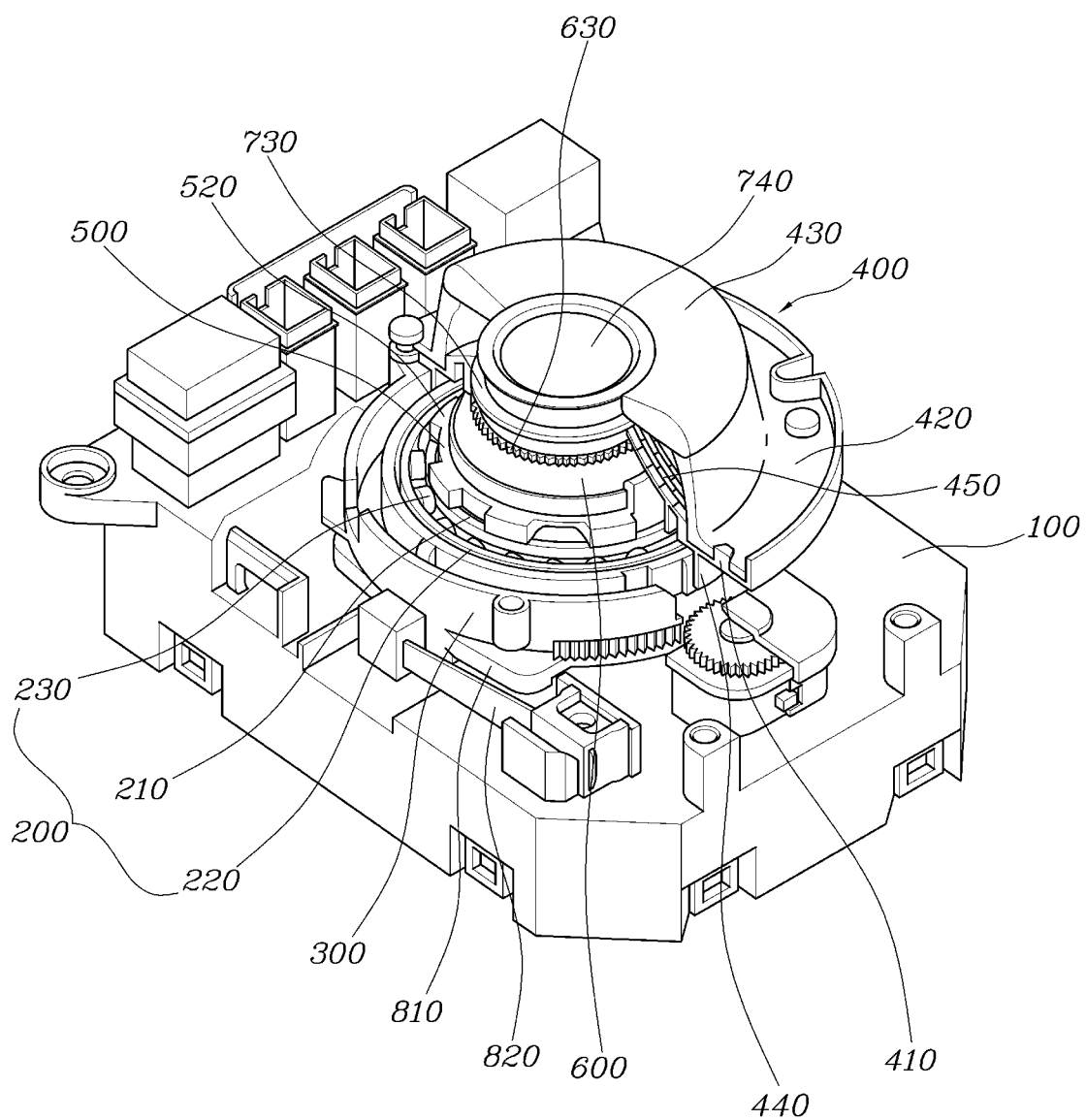
FIGS. 2 and 3 are perspective and cross-sectional views of a coupled state of the shift control apparatus shown in FIG. 1, respectively.
Figure 3:
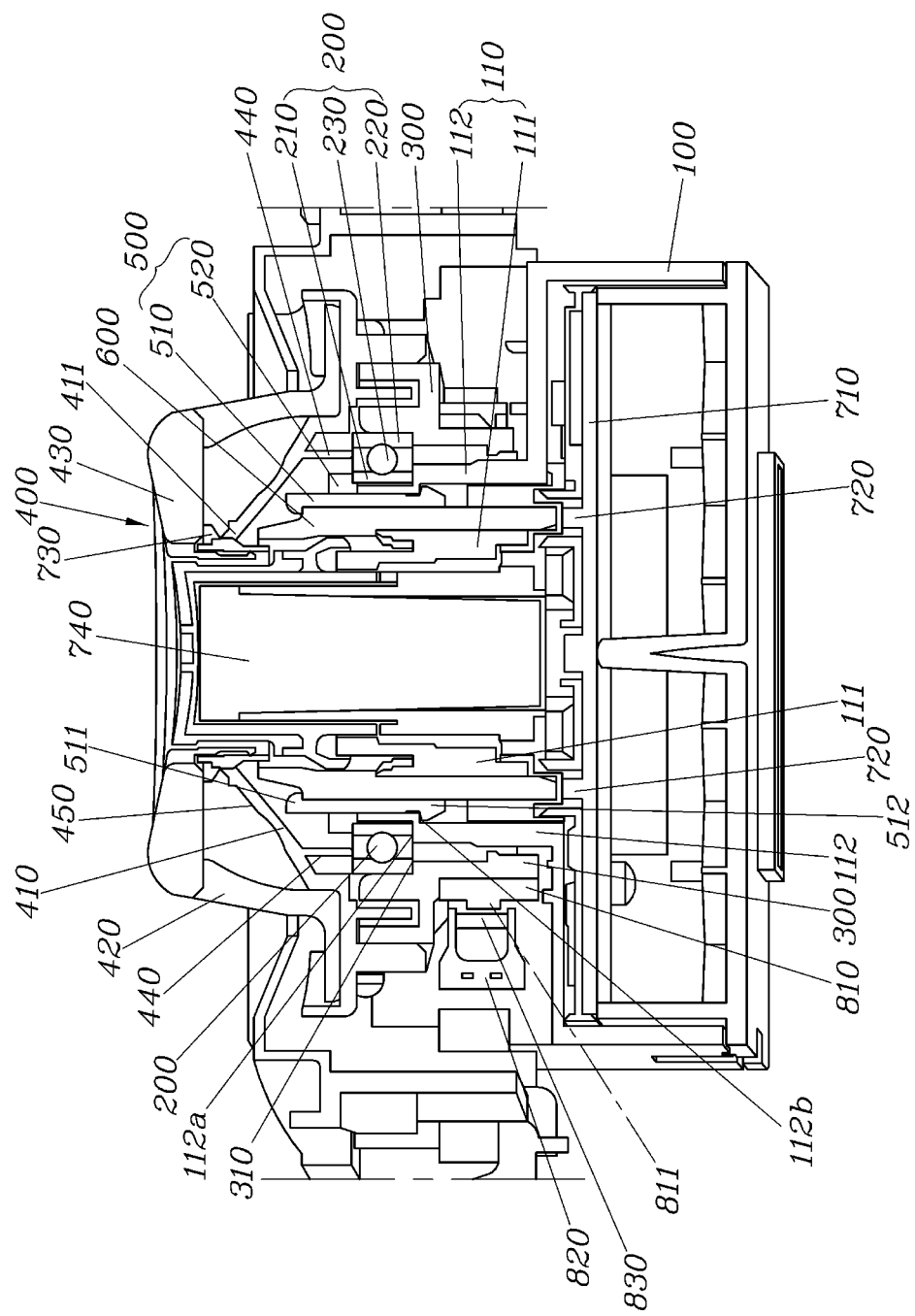
Figure 4:
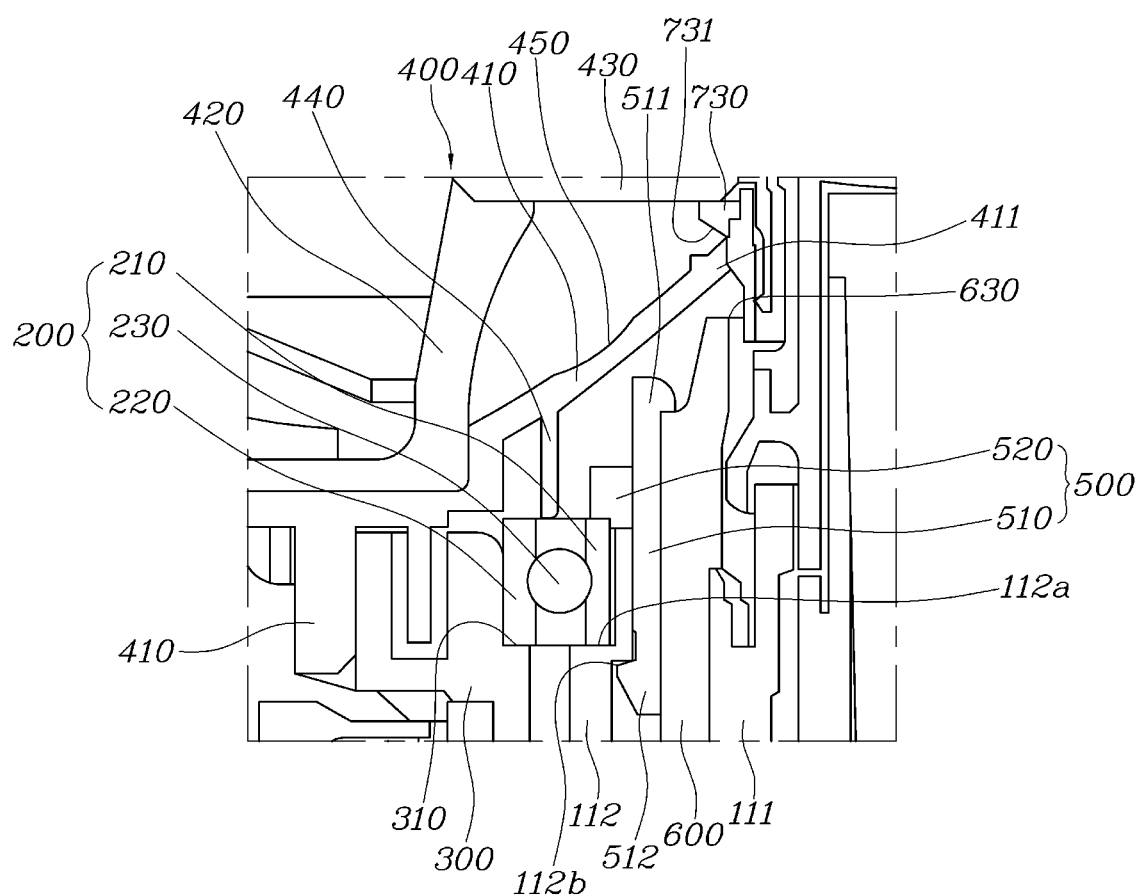
FIG. 4 is an enlarged view of a portion where a bearing is installed in FIG. 3.
Figure 5:
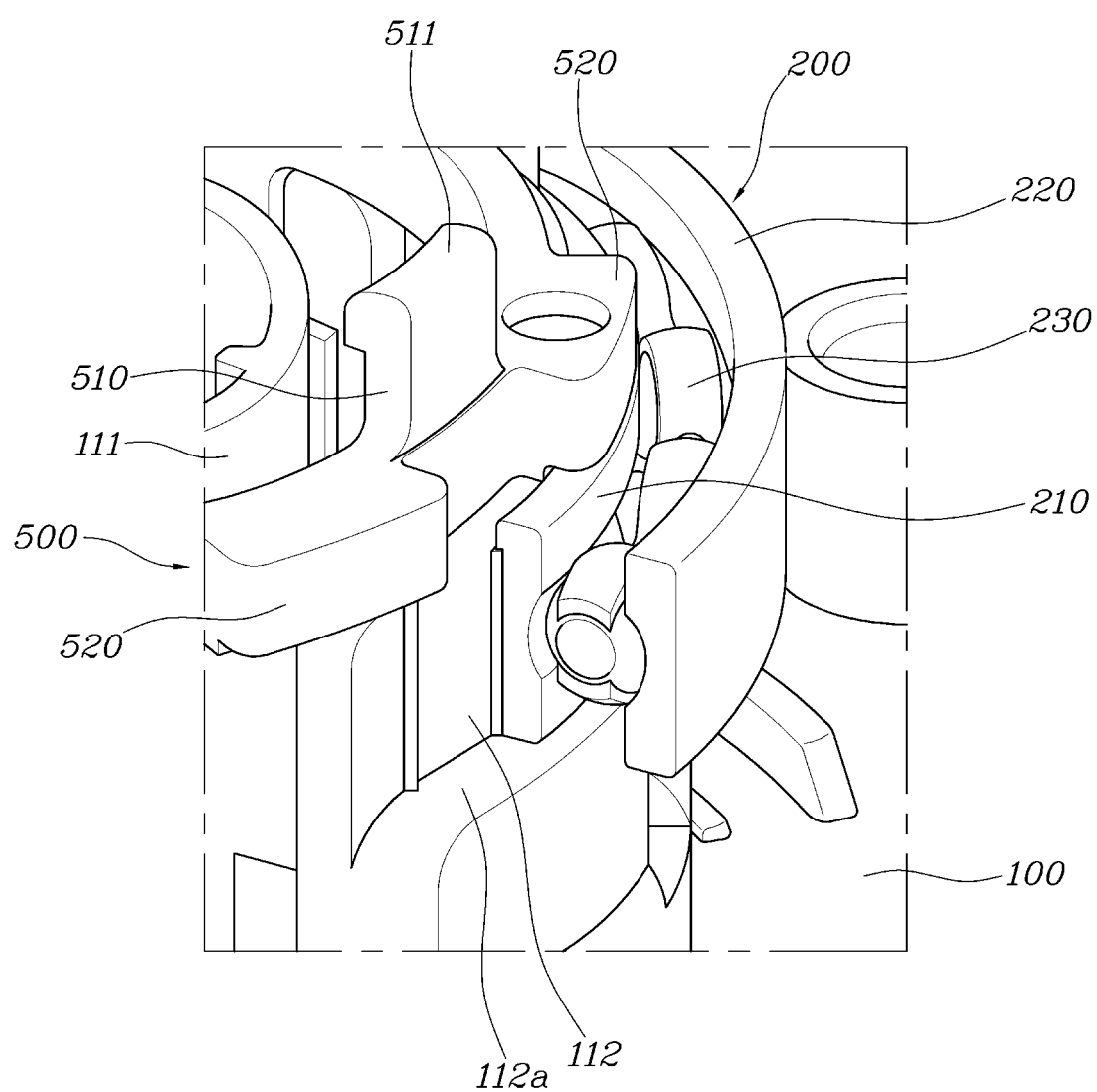
FIG. 5 is an enlarged view of a portion where a bearing holder is installed according to an embodiment of the present disclosure.
Figure 6:
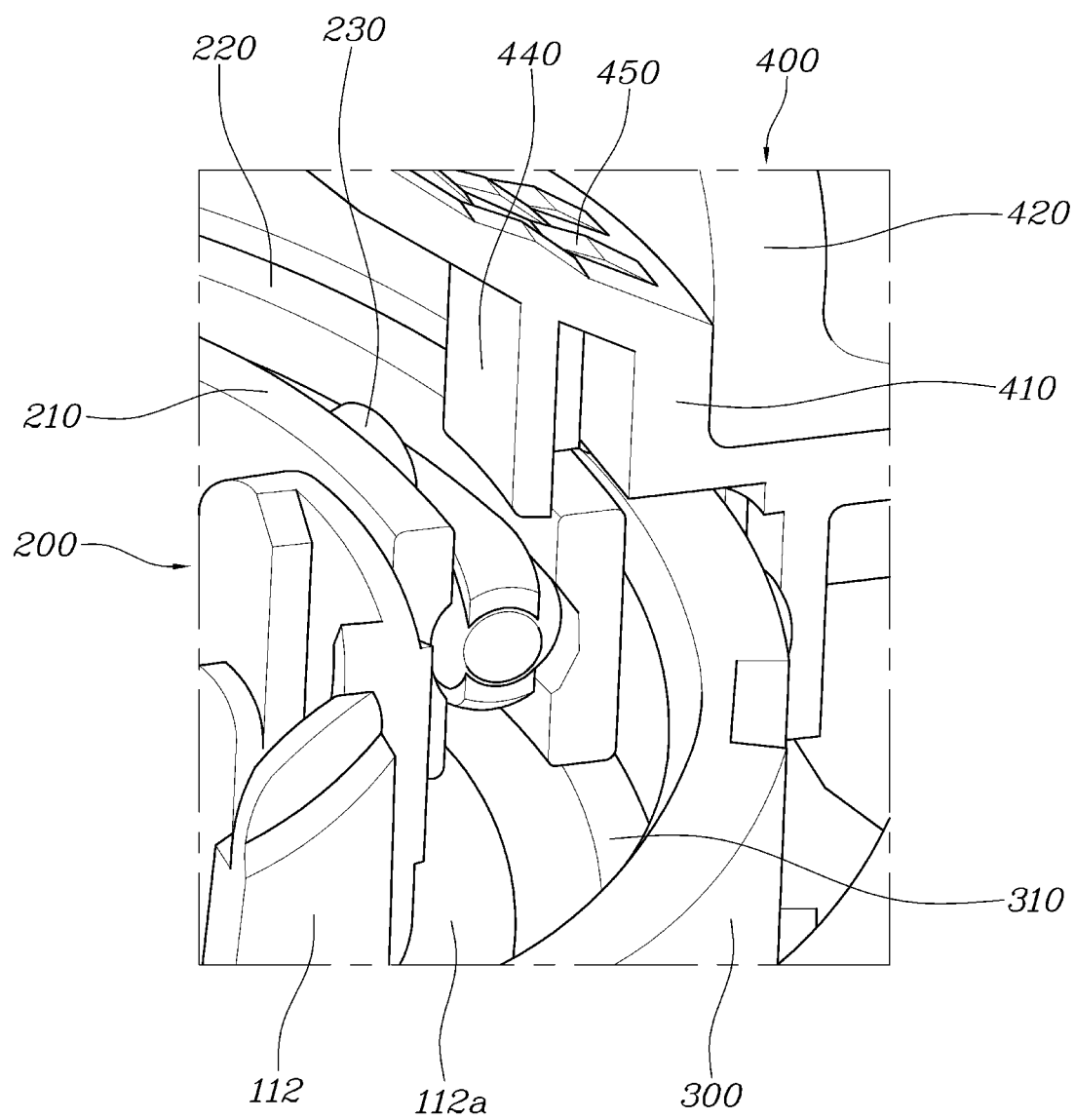
FIG. 6 is an enlarged view of a portion where a dial flange is installed according to an embodiment of the present disclosure.

Hereinafter, a dial type shift control apparatus for an electronic shift system according to an embodiment in the present disclosure is described with reference to the accompanying drawings.

The dial type shift control apparatus for an electronic shift system according to an embodiment of the present disclosure may include a main housing 100 having a boss portion 110 protruding upward as shown in FIGS. 1 to 7.

The main housing 100 may be fixedly installed on a vehicle body (console, center fascia or the like) positioned at a side of a driver's seat. Here, the main housing 100 may be integrally formed with the boss portion 110 formed in a shape of a cylinder and protruding upward.

The boss portion 110 may include a primary boss 111 formed in the shape of a cylinder having a predetermined diameter and a secondary boss 112 formed in the shape of a cylinder having a larger diameter than that of the primary boss in and positioned at an outside of the primary boss 111.

A bearing 200 may be fitted to an outside of the boss portion no, and a rotator 300 may be fitted to an outside of the bearing 200 and coupled to a shift dial 400 which is rotated and operated by the driver's hand.

The bearing 200 may include an inner race 210 forcibly press-fitted to an outside of the secondary boss 112 to be integrally coupled to the secondary boss 112, an outer race 220 forcibly press-fitted to an inside of the rotator 300 to be integrally coupled to the rotator 300 and a plurality of balls 230 positioned between the inner race 210 and the outer race 220.

The rotator 300 may be coupled to a lower portion of the shift dial 400 and thus be integrated with the shift dial 400, thereby forming a downward extension of the shift dial 400. The rotator 300 and the bearing 200 may be covered by the shift dial 400 not to be exposed to the outside. The rotator 300 and the shift dial 400 may be rotated together when operated by the driver.

The bearing 200 may be insertedly installed into a gap between the secondary boss 112 and the rotator 300 in such a manner that the bearing 200 is fitted to the outside of the secondary boss 112 and the rotator 300 is fitted to the outside of the bearing 200.

That is, the inner race 210 of the bearing 200 may be forcibly press-fitted and coupled to the outside of the secondary boss 112, and the rotator 300 coupled to the shift dial 400 may be forcibly press-fitted and coupled to an outside of the outer race 220 of the bearing 200.

Here, bearing support jaws 12a and 310 may be respectively formed on the outside of the secondary boss 112 and the inside of the rotator 300 to allow lower surfaces of the bearing 200 to be seated thereon. The bearing support jaws 12a and 310 may serve to support the lower surfaces of the bearing 200 to restrain a downward movement of the bearing 200.

The bearing support jaw 112a formed on the secondary boss 112 may support a lower surface of the inner race 210 of the bearing 200, and the bearing support jaw 310 formed on the rotator 300 may support a lower surface of the outer race 220 of the bearing 200.

Therefore, when the driver rotates the shift dial 400, the rotator 300 may be rotated with the shift dial 400, and the outer race 220 of the bearing 200 may be rotated together with the rotator 300. Here, the secondary boss 112 of the main housing 100 and the inner race 210 of the bearing 200 coupled with the secondary boss 112 may become a fixed component which is not supposed to be rotated.

As described above, an embodiment according to the present disclosure may have a configuration in which the bearing 200 is installed between the boss portion no of the main housing 100 and the rotator 300 coupled to the shift dial 400. The bearing 200 may prevent a direct contact between the boss portion 110 corresponding to the fixed component and the shift dial 400 and the rotator 300 corresponding to the rotated components. Due to the bearing 200, it is possible to avoid friction occurring when the shift dial 400 is rotated and operated. In this manner, it is also possible to avoid wear and noise caused by friction, thereby improving durability of the apparatus. Furthermore, the driver may not feel different due to the friction, and thus sense an improved operation of the apparatus.

In addition, in the present disclosure, the bearing 200 may be used to prevent the friction occurring between the boss portion 110 corresponding to the fixed component and the shift dial 400 and the rotator 300 corresponding to the rotated components. In this manner, it is possible to avoid a 'stuck' phenomenon of the shift dial 400 rotated from a Null stage to a drive (D) stage or from the Null stage to a reverse (R) stage. Accordingly, the dial type shift control apparatus may have an improved quality.

An embodiment according to the present disclosure may further have a configuration in which a bearing holder 500 is used to restrain an upward movement of the bearing 200 to prevent the bearing 200 from being deviated upward.

The bearing holder 500 may be positioned in the shift dial 400 and fitted to a gap between the primary boss in and the secondary boss 112 to be in contact with an upper surface of the bearing 200.

In more detail, a light guide 600 may be fitted to the outside of the primary boss 111 to be coupled to the primary boss in, and a cylindrical holder coupling portion 510 configuring the bearing holder 500 may be fitted to a gap between the light guide 600 and the secondary boss 112. Here, upper and lower ends of the holder coupling portion 510 may each have a cross section formed in a shape of a triangular protrusion. Therefore, an upper triangular protrusion cross section 511 may be coupled to an upper edge of the light guide 600 in a locking structure of the cross section, and a lower triangular protrusion cross section 512 may be coupled to a locking jaw 112*b* formed in the secondary boss 112 in a locking structure of the cross section.

A bearing press portion 520 configuring the bearing holder 500 may be formed to protrude outward from the holder coupling portion 510. Therefore, the bearing press portion 520 may press an upper surface of the inner race 210 of the bearing 200 when the holder coupling portion 510 is insertedly installed to the gap between the light guide 600 and the secondary boss 112. In this manner, the bearing 200 may be pressurized by the bearing holder 500 to be prevented from being moved and deviated upward.

The shift dial 400 may schematically include a lower dial 410 coupled to the rotator 300, an upper dial 420 coupled to the lower dial 410 and operated by the driver and a lighting window 430 coupled onto the upper dial 420.

According to an embodiment in the present disclosure, a dial flange 440 protruding toward the bearing 200 installed between the secondary boss 112 and the rotator 300 may be integrally formed onto an inner surface of the shift dial 400, more specifically, onto an inner lower surface of the lower dial 410.

A lower end of the dial flange 440 may be configured to be slightly spaced apart upward from the bearing 200. When the bearing 200 is moved upward by an external force, the lower end of the dial flange 440 may thus be brought into contact with the upper surface of the bearing 200 to prevent the bearing 200 from being deviated upward together with the bearing holder 500.

The dial type shift control apparatus according to an embodiment of the present disclosure may further include a printed circuit board (PCB) 710 fixedly installed on the main housing 100, a light source 720 installed on the PCB 710 and a reflector 730 fitted onto the lower dial 410.

A shift control may be electronically performed in a following manner. A transmission control unit (TCU) may receive, through the PCB 710, D, R and Null stage signals generated by rotating and operating the shift dial 400 and a park (P) stage signal generated by pressing a P stage button 740. The electronic signal commanded by the TCU may allow a shift actuator to be operated, and the operation of the shift actuator may allow the hydraulic pressure to be applied to or shut off from the hydraulic circuit for each shift stage.

The light source 720 installed on the PCB 710 may be a light emitting diode (LED) light source, and accordingly may implement indirect lighting (mood lighting or ambient lighting) when turned on.

When the LED light source 720 is turned on by controlling PCB 710 through a switch operation, light generated by the light source 720 may move through the light guide 600 and then pass through a light transmission portion 411 of the lower dial 410. After passing through the light transmission portion 411 of the lower dial 410, the light may be reflected on a lower surface (inclined surface) of the reflector 730 coupled onto the lower dial 410 and then irradiated onto a pattern layer 450 formed on a surface of the lower dial 410. The light irradiated onto the pattern layer 450 may be exposed to the outside through the lighting window 430 configuring the shift dial 400, thereby implementing the indirect lighting.

In addition, the dial type shift control apparatus according to the present disclosure may further have a configuration in which the shift dial 400 when rotated and operated allows the driver to sense an operation feeling (substantial operation feeling) of the dial, and the shift dial 400 when released after being rotated returns to its return position.

That is, an operation feeling generation portion 810 may be integrally formed with the rotator 300, and a groove 811 recessed in an arc shape may be formed in a middle portion of the operation feeling generation portion 810 in a length direction.

The operation feeling generation portion 810 may be formed to be extended in a radial direction of the rotator 300, and both ends of the operation feeling generation portion 810 may thus be extended in a circumferential direction.

In addition, a leaf spring assembly 820 may have one end to which the main housing 100 is fixedly coupled and the other end to which a roller 830 is rotatably coupled. When the shift dial 400 is rotated, the roller 830 may be inserted into the groove 811 or move out of the groove 811 and be in contact with a side surface of the operation feeling generation portion 810.

Figure 7:
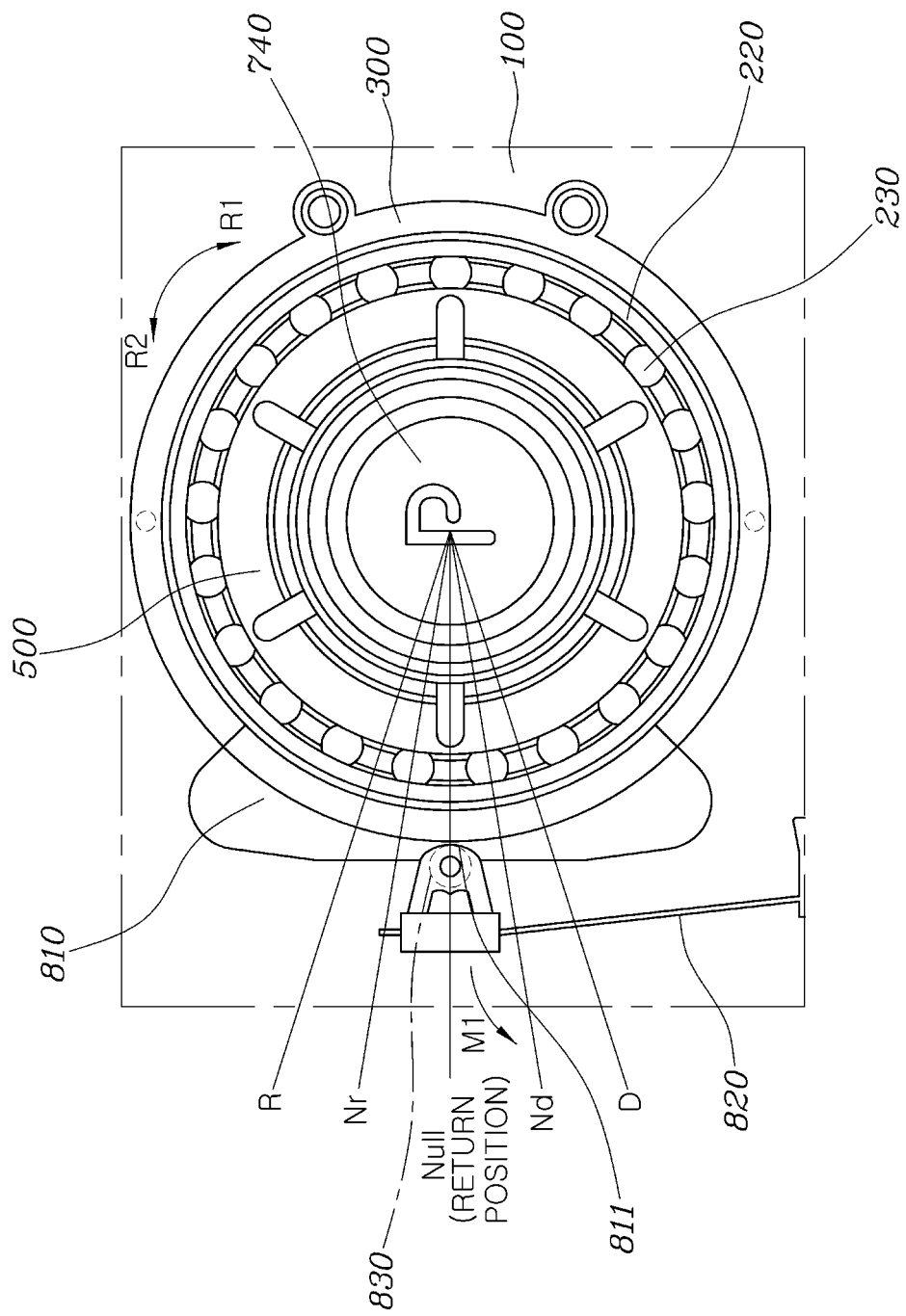
FIG. 7 is a view for explaining a configuration providing an operation feeling and a return force of a shift dial according to an embodiment of the present disclosure.

As shown in FIG. 7, when the roller 830 is positioned in the groove 811 of the operation feeling generation portion 810, the shift stage of the vehicle may remain in the Null stage.

In a state where the shift gear is in the Null stage, when the driver rotates the shift dial 400 clockwise (arrow R1), the rotator 300 may be rotated to cause the roller 830 in the groove 811 of the operation feeling generation portion 811 to move out of the groove 811 and be in contact with the surface of the operation feeling generation portion 810. Here, the leaf spring assembly 820 may be bent to the outside (arrow M1) to have an accumulated elastic force, and the shift stage may be changed to a neutral and drive (Nd) stage or the D stage.

In addition, when the driver releases the operation of the shift dial 400 rotated to the Nd stage or the D stage, the leaf spring assembly 820 bent to the outside (arrow M1) may be moved in an opposite direction of the arrow M1 by its resilience. By this resilience of the leaf spring assembly 820, the roller 830, which is out of the groove 811 and in contact with the surface of the operation feeling generation portion 810, may be inserted into the groove 811 again. Through this operation of the roller 830, the shift dial 400 positioned at the Nd stage or the D stage may be rotated counterclockwise (arrow R2) by the resilience of the leaf spring assembly 820 to return to the Null stage, i.e. its return position.

In addition, the rotation of the dial from the Null stage to either a neutral and reverse (Nr) stage or the R stage and the return operation of the dial from either the Nr stage or the R stage to the Null stage are the same as described above. Therefore, detailed descriptions thereof are omitted.

As described above, the dial type shift control apparatus according to embodiments of the present disclosure may have a configuration in which the bearing 200 is installed between the boss portion 110 of the main housing 100 and the rotator 300 coupled to the shift dial 400. The bearing 200 may prevent a direct contact between the boss portion 110 corresponding to the fixed component and the shift dial 400 and the rotator 300 corresponding to the rotated components. Due to the bearing 200, it is possible to avoid friction from occurring when the shift dial 400 is rotated and operated. In this manner, it is also possible to avoid wear and noise caused by friction, thereby improving durability of the apparatus. Furthermore, the driver may not feel different due to the friction, and thus sense an improved operation of the apparatus.

In addition, in embodiments of the present disclosure, the bearing 200 may be used to prevent friction from occurring between the boss portion 110 corresponding to the fixed component and the shift dial 400 and the rotator 300 corresponding to the rotated components. In this manner, it is possible to avoid a 'stuck' phenomenon of the shift dial 400 rotated from a Null stage to a drive (D) stage or from the Null stage to a reverse (R) stage. Accordingly, the dial type shift control apparatus may have an improved quality.

Although the present disclosure is shown and described with respect to specific embodiments, it is apparent to those having ordinary skill in the art that the present disclosure may be variously modified and altered without departing from the spirit and scope of the present disclosure as defined by the following claims.

What is claimed is:

1. A dial type shift control apparatus for an electronic shift system, the apparatus comprising:
   a main housing having a boss portion protruding upward;
   a bearing fitted to an outside of the boss portion;
   a rotator fitted to an outside of the bearing;
   a shift dial coupled to the rotator, wherein the shift dial covers the rotator and the bearing from above and wherein the shift dial is configured to rotate with the rotator when operated by a driver; and
   a bearing holder installed in the shift dial, wherein the bearing holder is in contact with an upper surface of the bearing and is configured to restrain an upward movement of the bearing to prevent the bearing from being deviated;
   wherein the boss portion includes a primary boss protruding in a shape of a cylinder and a secondary boss formed in a shape of a cylinder having a larger diameter than that of the primary boss and positioned at an outside of the primary boss;
   wherein the bearing is fitted to the outside of the secondary boss; and
   wherein the bearing holder is fitted to a gap between the primary boss and the secondary boss to be in contact with the upper surface of the bearing.

2. The apparatus of claim 1, wherein:
   the rotator is fitted to an outside of the secondary boss; and
   the bearing is fitted into a gap between the secondary boss and the rotator.

3. The apparatus of claim 2, wherein the bearing includes:
   an inner race fitted to the outside of the secondary boss to be integrally coupled to the secondary boss;
   an outer race fitted to an inside of the rotator to be integrally coupled to the rotator; and
   a plurality of balls positioned between the inner race and the outer race.

4. The apparatus of claim 2, further comprising bearing support jaws formed on the outside of the secondary boss and the inside of the rotator, respectively, to allow lower surfaces of the bearing to be seated thereon.

5. The apparatus of claim 2, further comprising a dial flange protruding toward the bearing fitted into the gap between the secondary boss and the rotator and integrally formed onto an inner surface of the shift dial, wherein the dial flange is configured to be brought into contact with the bearing to prevent the bearing from being deviated upward together with the bearing holder when the bearing is moved upward.

6. The apparatus of claim 1, wherein the bearing includes:
   an inner race fitted to the outside of the secondary boss to be integrally coupled to the secondary boss;
   an outer race fitted to an inside of the rotator to be integrally coupled to the rotator; and
   a plurality of balls positioned between the inner race and the outer race.

7. The apparatus of claim 6, further comprising a light guide fitted to the outside of the primary boss to be coupled to the primary boss, wherein:
   the bearing holder includes a holder coupling portion and a bearing press portion;
   the holder coupling portion is formed along the shape of the cylinder and is fitted to a gap between the light guide and the secondary boss, wherein upper and lower ends are fixedly coupled to the light guide and the secondary boss, respectively; and
   the bearing press portion is formed to protrude outward from the holder coupling portion and to press an upper surface of the inner race of the bearing.

8. A vehicle comprising:
   a vehicle body; and
   a dial type shift control apparatus for an electronic shift system comprising:
      a main housing installed on the vehicle body, wherein the main housing comprises a boss portion protruding upward;
      a bearing fitted to an outside of the boss portion;
      a rotator fitted to an outside of the bearing;
      a shift dial coupled to the rotator, wherein the shift dial covers the rotator and the bearing from above, and wherein the shift dial is configured to rotate with the rotator when operated by a driver; and
      a bearing holder installed in the shift dial, wherein the bearing holder is in contact with an upper surface of the bearing and is configured to restrain an upward movement of the bearing to prevent the bearing from being deviated; wherein:
      wherein the boss portion includes a primary boss protruding in a shape of a cylinder and a secondary boss formed in a shape of a cylinder having a larger diameter than that of the primary boss and positioned at an outside of the primary boss;
      wherein the bearing is fitted to the outside of the secondary boss; and
      wherein the bearing holder is fitted to a gap between the primary boss and the secondary boss to be in contact with the upper surface of the bearing.

9. The vehicle of claim 8, wherein:
the rotator is fitted to an outside of the secondary boss; and
the bearing is fitted into a gap between the secondary boss and the rotator.

10. The vehicle of claim 9, wherein the bearing includes:
an inner race fitted to the outside of the secondary boss to be integrally coupled to the secondary boss;
an outer race fitted to an inside of the rotator to be integrally coupled to the rotator; and
a plurality of balls positioned between the inner race and the outer race.

11. The vehicle of claim 9, further comprising bearing support jaws formed on the outside of the secondary boss and the inside of the rotator, respectively, to allow lower surfaces of the bearing to be seated thereon.

12. The vehicle of claim 9, further comprising a dial flange protruding toward the bearing fitted into the gap between the secondary boss and the rotator and integrally formed onto an inner surface of the shift dial, wherein the dial flange is configured to be brought into contact with the bearing to prevent the bearing from being deviated upward together with the bearing holder when the bearing is moved upward.

13. The vehicle of claim 8, wherein the bearing includes:
an inner race fitted to the outside of the secondary boss to be integrally coupled to the secondary boss;
an outer race fitted to an inside of the rotator to be integrally coupled to the rotator; and
a plurality of balls positioned between the inner race and the outer race.

14. The vehicle of claim 13, further comprising a light guide fitted to the outside of the primary boss to be coupled to the primary boss, wherein:
the bearing holder includes a holder coupling portion and a bearing press portion;
the holder coupling portion is formed along the shape of the cylinder and is fitted to a gap between the light guide and the secondary boss, wherein upper and lower ends are fixedly coupled to the light guide and the secondary boss, respectively; and
the bearing press portion is formed to protrude outward from the holder coupling portion and to press an upper surface of the inner race of the bearing.

15. A dial type shift control apparatus for an electronic shift system, the apparatus comprising:
a main housing having a boss portion protruding upward, wherein the boss portion includes a primary boss protruding in a shape of a cylinder and a secondary boss formed in a shape of a cylinder having a larger diameter than that of the primary boss and positioned at an outside of the primary boss;
a bearing fitted to an outside of the boss portion;
a rotator fitted to an outside of the bearing, wherein the rotator is fitted to an outside of the secondary boss and the bearing is fitted into a gap between the secondary boss and the rotator;
a shift dial coupled to the rotator, wherein the shift dial covers the rotator and the bearing from above, and wherein the shift dial is configured to rotate with the rotator when operated by a driver;
a bearing holder installed in the shift dial, wherein the bearing holder is in contact with an upper surface of the bearing and is configured to restrain an upward movement of the bearing to prevent the bearing from being deviated; and
a dial flange protruding toward the bearing fitted into the gap between the secondary boss and the rotator and integrally formed onto an inner surface of the shift dial, wherein the dial flange is configured to be brought into contact with the bearing to prevent the bearing from being deviated upward together with the bearing holder when the bearing is moved upward.

16. The apparatus of claim 15, wherein the bearing includes:
an inner race fitted to the outside of the secondary boss to be integrally coupled to the secondary boss;
an outer race fitted to an inside of the rotator to be integrally coupled to the rotator; and
a plurality of balls positioned between the inner race and the outer race.

17. The apparatus of claim 15, further comprising bearing support jaws formed on the outside of the secondary boss and the inside of the rotator, respectively, to allow lower surfaces of the bearing to be seated thereon.

18. The apparatus of claim 15, wherein:
the bearing is fitted to the outside of the secondary boss; and
the bearing holder is fitted to a gap between the primary boss and the secondary boss to be in contact with the upper surface of the bearing.

19. The apparatus of claim 18, wherein the bearing includes:
an inner race fitted to the outside of the secondary boss to be integrally coupled to the secondary boss;
an outer race fitted to an inside of the rotator to be integrally coupled to the rotator; and
a plurality of balls positioned between the inner race and the outer race.

20. The apparatus of claim 19, further comprising a light guide fitted to the outside of the primary boss to be coupled to the primary boss, wherein:
the bearing holder includes a holder coupling portion and a bearing press portion;
the holder coupling portion is formed along the shape of the cylinder and is fitted to a gap between the light guide and the secondary boss, wherein upper and lower ends are fixedly coupled to the light guide and the secondary boss, respectively; and
the bearing press portion is formed to protrude outward from the holder coupling portion and to press an upper surface of the inner race of the bearing.

* * * * *